(12) United States Patent
Chen et al.

(10) Patent No.: US 10,378,666 B2
(45) Date of Patent: Aug. 13, 2019

(54) ADJUSTABLE PRESSURE VALVE

(71) Applicant: BANZA STAMPING INDUSTRY CORP., Su'ao Township, Yilan County (TW)

(72) Inventors: Li-Wei Chen, Su'ao Township, Yilan County (TW); Cole Krebs, Su'ao Township, Yilan County (TW)

(73) Assignee: BANZA STAMPING INDUSTRY CORP., Su'ao Township, Yilan County (TW)

( * ) Notice: Subject to any disclaimer, the term of this patent is extended or adjusted under 35 U.S.C. 154(b) by 106 days.

(21) Appl. No.: 15/623,597

(22) Filed: Jun. 15, 2017

(65) Prior Publication Data

US 2018/0363793 A1    Dec. 20, 2018

(51) Int. Cl.
*F16K 17/06* (2006.01)
*G05D 1/00* (2006.01)

(52) U.S. Cl.
CPC .............. *F16K 17/06* (2013.01); *G05D 1/00* (2013.01); *Y10T 137/8225* (2015.04); *Y10T 137/8275* (2015.04)

(58) Field of Classification Search
CPC ........ F16K 1/52; F16K 17/06; F16K 27/0281; G05D 7/01; G05D 7/0126; G05D 1/00; Y10T 137/8158; Y10T 137/8225; Y10T 137/8275
See application file for complete search history.

(56) References Cited

U.S. PATENT DOCUMENTS

| | | | | |
|---|---|---|---|---|
| 334,011 A * | 1/1886 | Franklin | .............. | G05D 7/0106 137/503 |
| 371,063 A * | 10/1887 | Hays | .................... | G05D 7/0106 137/503 |
| 593,594 A * | 11/1897 | Marea et al. | ......... | F16K 15/026 137/538 |
| 1,150,743 A * | 8/1915 | Butts | ........................ | F16K 1/46 137/516.29 |
| 2,080,760 A * | 5/1937 | Condon | .................. | F16K 17/06 137/524 |
| 3,643,620 A * | 2/1972 | Penny | ..................... | F15B 13/14 116/269 |
| 3,643,685 A * | 2/1972 | Hays | ....................... | F16K 1/126 137/501 |
| 4,728,075 A * | 3/1988 | Paradis | ..................... | F16K 1/52 251/122 |
| 4,848,403 A * | 7/1989 | Pilolla | ..................... | F16K 3/085 137/625.31 |

(Continued)

*Primary Examiner* — Jessica Cahill
(74) *Attorney, Agent, or Firm* — patenttm.us

(57) ABSTRACT

An adjustable pressure valve has a valve body, an inactive cap and an active cap. The inactive cap is mounted in the outlet of the valve body, abuts against the piston in the valve body and has an inclined edge. The active cap is mounted rotatably against the inactive cap and has an inclined edge abutting against the inclined edge of the inactive cap. When the active cap is rotated relative to the inactive cap, the inactive cap is pushed by the inclined edge of the active cap to slide inwardly or outwardly. Then the elastic element in the valve body is compressed more or less by the slide of the active cap to adjust the preset outlet pressure without disassembling the adjustable pressure valve.

16 Claims, 9 Drawing Sheets

(56) References Cited

U.S. PATENT DOCUMENTS 7,156,120 B2 * 1/2007 Cherfane ............. G05D 7/0133
                                                                    137/504
2012/0025114 A1 * 2/2012 Lymberopoulos ...........................
                                                                   F16K 31/1262
                                                                          251/12

* cited by examiner

ADJUSTABLE PRESSURE VALVE

BACKGROUND OF THE INVENTION

1. Field of the Invention

The present invention relates to a pressure valve, and more particularly to an adjustable pressure valve.

2. Description of the Prior Arts

Pressure valves are used to reduce the input pneumatic pressure to a desired output pneumatic pressure and are used widely in various devices. A conventional pressure valve includes a piston mounted movably between the inlet and the outlet to selectively stop the gas flow from a gas source to a downstream device. A spring is mounted around the piston to urge the piston to move toward the outlet. When the outlet pressure is set at the preset pressure, the elastic force of the spring is offset by the outlet pressure so that the piston is urged to seal the inlet to stop the gas from flowing through the conventional pressure valve. When the outlet pressure begins to decrease, the outlet pressure is not strong enough to offset the elastic force of the spring so that the piston is urged to move away from the inlet to allow the gas to flow through the conventional pressure valve.

The conventional pressure valve utilizes different springs to preset the desired outlet pressure. The springs has tolerance so that the preset outlet pressure is different with the desired outlet pressure. To reduce the difference, the manufacturer has to change the spring. Since the preset outlet pressure can only be measured after the conventional pressure valve is assembled, the manufacturer needs to disassemble the conventional pressure valve if the preset outlet pressure does not match the desired outlet pressure. Therefore, the manufacturing process of the conventional pressure valve is more complicated.

To overcome the shortcomings, the present invention provides an adjustable pressure valve to mitigate or obviate the aforementioned problems.

SUMMARY OF THE INVENTION

The main objective of the present invention is to provide an adjustable pressure valve that has the preset outlet pressure to be adjustable without disassembling. The adjustable pressure valve has a valve body, an inactive cap and an active cap. The inactive cap is mounted in the outlet of the valve body, abuts against the piston in the valve body and has an inclined edge. The active cap is mounted rotatably against the inactive cap and has an inclined edge abutting against the inclined edge of the inactive cap. When the active cap is rotated relative to the inactive cap, the inactive cap is pushed by the inclined edge of the active cap to slide inwardly or outwardly. Then the elastic element in the valve body is compressed more or less by the slide of the active cap to adjust the preset outlet pressure without disassembling the adjustable pressure valve.

Other objectives, advantages and novel features of the invention will become more apparent from the following detailed description when taken in conjunction with the accompanying drawings.

DETAILED DESCRIPTION OF THE EMBODIMENTS

Figure 1:
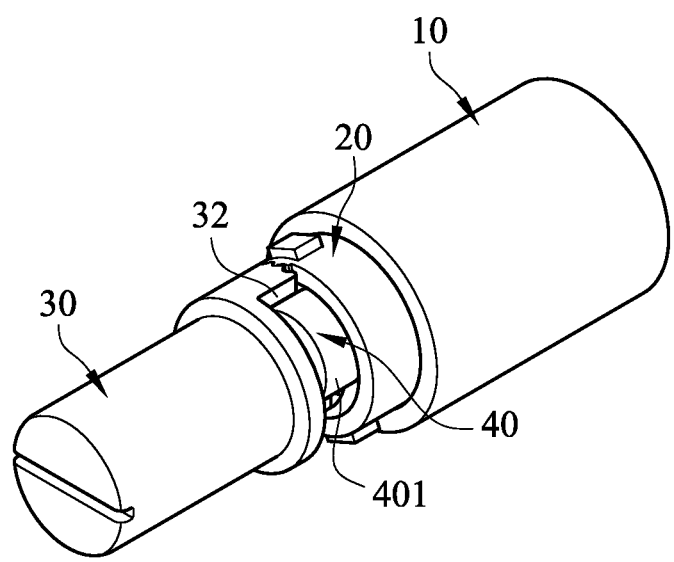
FIG. 1 is a perspective view of an adjustable pressure valve in accordance with the present invention.
Figure 2:
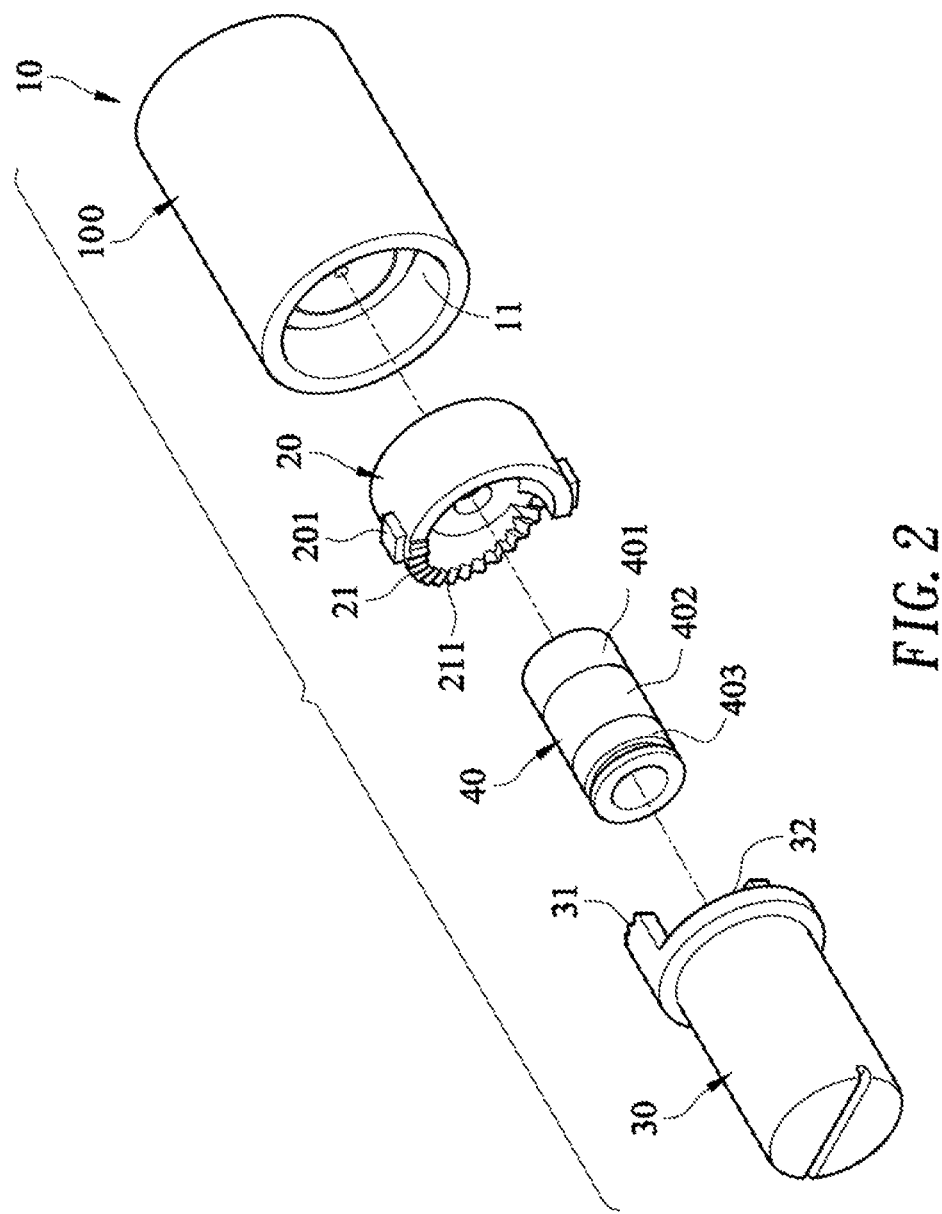
FIG. 2 is an exploded perspective view of the adjustable pressure valve in FIG. 1.

With reference to FIGS. 1 and 2, an adjustable pressure valve in accordance with the present invention comprises a valve body 10, an inactive cap 20, an active cap 30 and an indicator 40.

Figure 3:
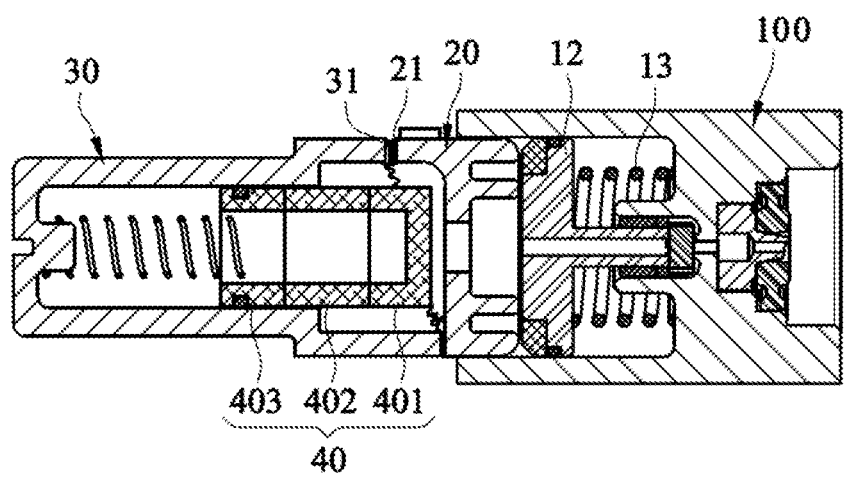
FIG. 3 is a side view in partial section of the adjustable pressure valve in FIG. 1.

With reference to FIGS. 1 to 3, the valve body 10 selectively stops gas from flowing through the valve body 10 and has shell 100 with an outlet 11, a piston 12 and an elastic element 13. The piston 12 is mounted slidably in the shell 100 near the outlet 11. The elastic element 13 is mounted in the shell 100 and is pressed between the piston 12 and an inside wall of the shell 100.

Figure 4:
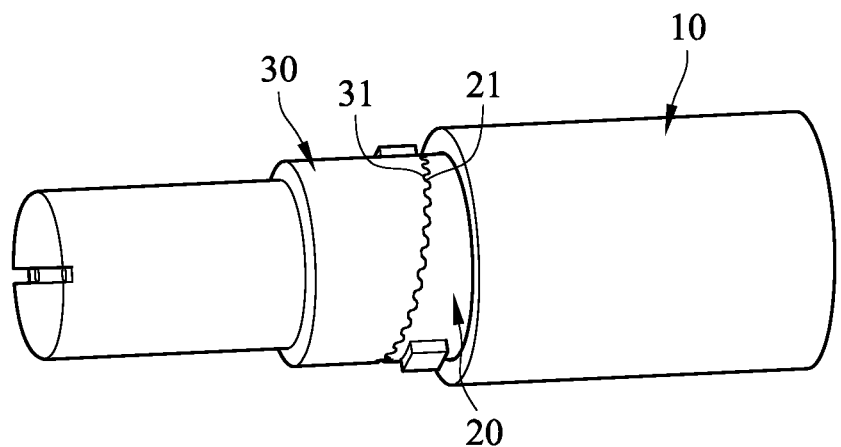
FIG. 4 is a side view of the adjustable pressure valve in FIG. 1.
Figure 5:
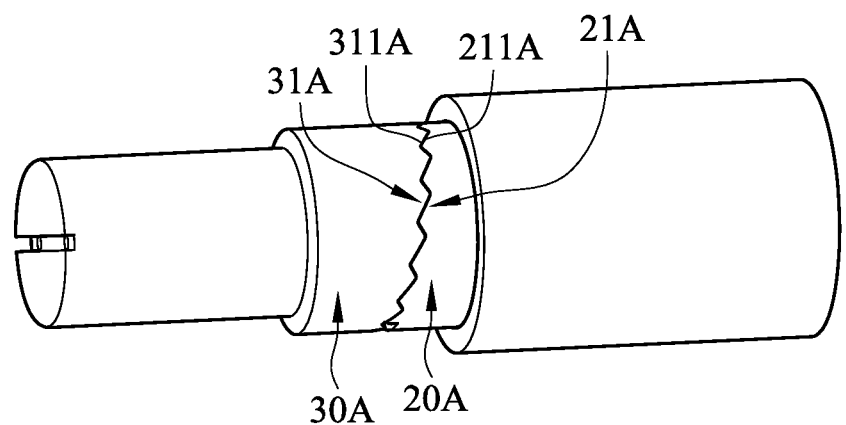
FIG. 5 is a side view of another embodiment of an adjustable pressure valve in accordance with the present invention.
Figure 6:
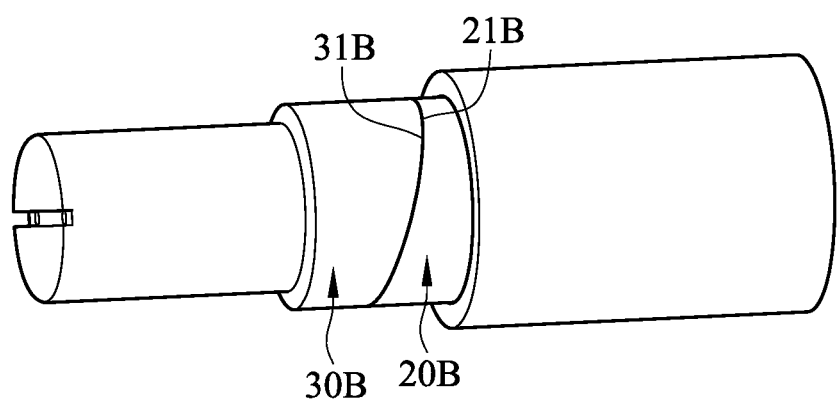
FIG. 6 is a side view of yet another embodiment of an adjustable pressure valve in accordance with the present invention.

With reference to FIGS. 2 to 4, the inactive cap 20 is mounted slidably through the outlet 11 of the valve body 10, abuts against the piston 12, and is kept from rotating relative to the valve body 10. In one embodiment, the inactive cap 20 has at least one bump 201 formed on an outside wall of the inactive cap 20 to be held in corresponding slots to restrict the inactive cap 20 from rotating relative to the valve body 10. The inactive cap 20 has an outer end and an inclined edge 21 formed on the outer end of the inactive cap 20. In one embodiment as shown in FIG. 4, multiple teeth 211 are formed on the inclined edge 21 of the inactive cap 20. In one embodiment as shown in FIG. 5, multiple steps 211A are formed on the inclined edge 21A of the inactive cap 20A. In one embodiment as shown in FIG. 6, the inclined edge 21B of the inactive cap 20B is flat.

Figure 7:
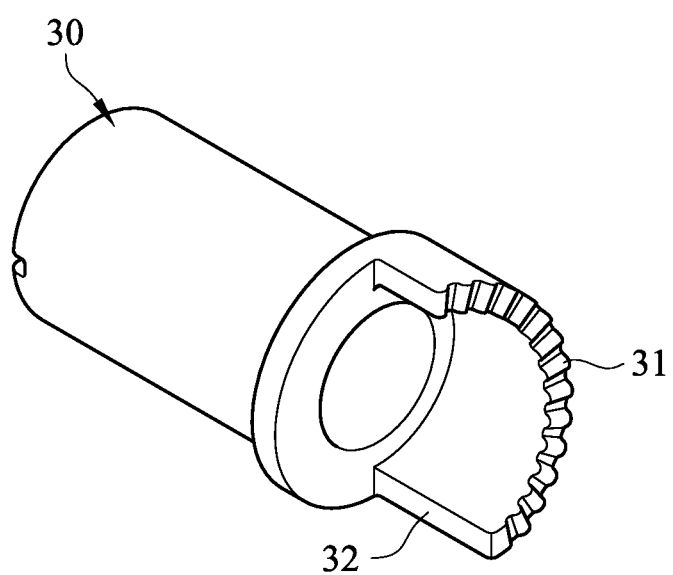
FIG. 7 is a perspective view of an active cap of the adjustable pressure valve in FIG. 1.
Figure 8:
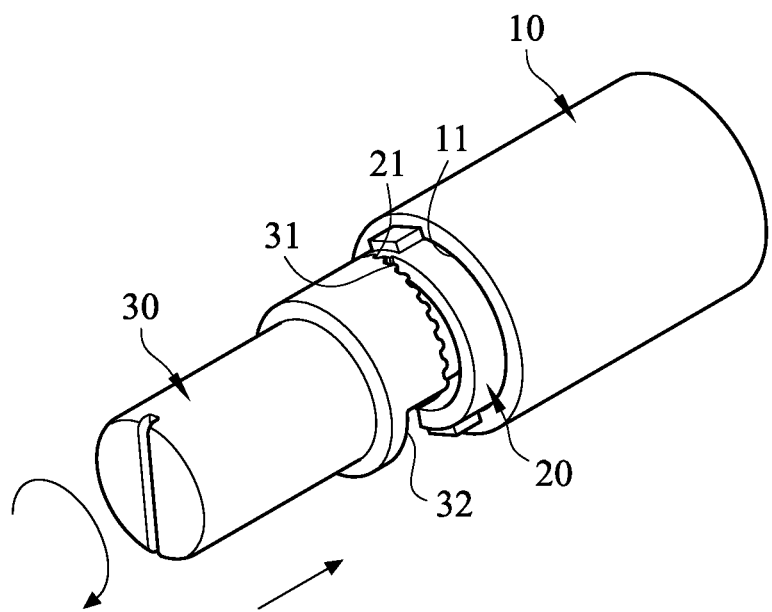
FIG. 8 is an operational perspective view of the adjustable pressure valve in FIG. 1.
Figure 9:
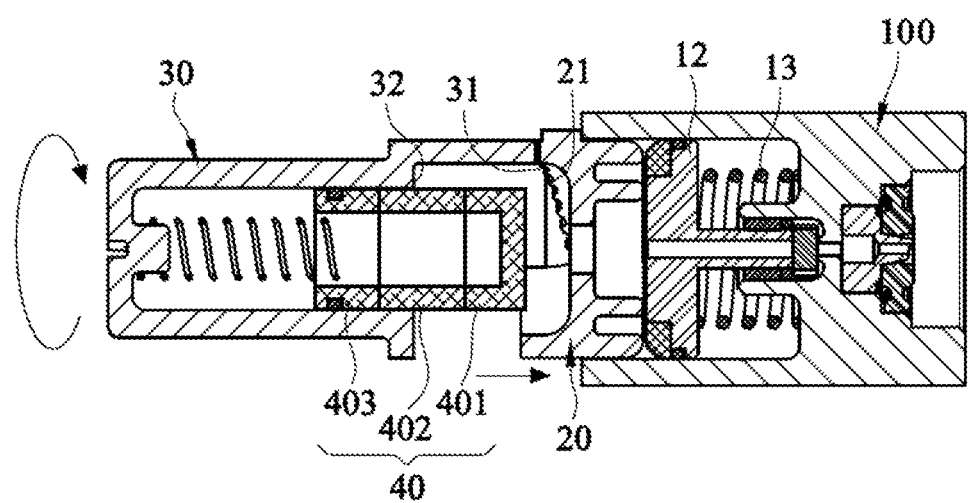
FIG. 9 is an operational side view in partial section of the adjustable pressure valve in FIG. 1.

With reference to FIGS. 2 and 7, the active cap 30 is mounted rotatably against the inactive cap 20 and is kept from detaching from the inactive cap 20. The active cap 30 has a sidewall, an inner end, an inclined edge 31 and a notch 32. The inner end of the active cap 30 faces the outer end of the inactive cap 20. The inclined edge 31 of the active cap 30 is formed on the inner end of the active cap 30 and abuts against the inclined edge 21 of the inactive cap 20. The notch 32 is formed through the sidewall and is formed in the inner end of the active cap 30. In one embodiment as shown in FIG. 4, multiple teeth 311 are formed on the inclined edge 31 of the active cap 30 and engage with the teeth 211 of the inactive cap 20 so that the adjustment between the active cap 30 and the inactive cap 20 is segmented. In one embodiment as shown in FIG. 5, multiple steps 311A are formed on the inclined edge 31A of the active cap 30A and engage with the steps 211A of the inactive cap 20A so that the adjustment between the active cap 30A and the inactive cap 20A is segmented. In one embodiment as shown in FIG. 6, the inclined edge 31B of the active cap 30B is flat so that the adjustment between the active cap 30B and the inactive cap 20B is non-segmented.

With reference to FIGS. 2 and 3, the indicator 40 is mounted slidably in the active cap 30 and is kept from detaching from the active cap 30. The indicator 40 has a sidewall divided into different sections 401, 402, 403. The sections 401, 402, 403 of the sidewall of the indicator 40 selectively correspond to the notch 32 and respectively have different marks to distinguish them from each other. Therefore, when one of the sections 401, 402, 403 corresponds to the notch 32, to distinguish which section 401, 402, 403 corresponds to the notch is easy by noting the different marks. In one embodiment, the different marks are different colors. In another embodiment, the different marks are different letters or symbols.

With reference to FIGS. 1, 3, 8 and 9, when a preset outlet pressure does not math to a desired outlet pressure, the active cap 30 is rotated to adjust the present outlet pressure. When the active cap 30 is rotated relative to the inactive cap 20, the inclined edge 31 of the active cap 30 moves along the inclined edge 21 of the inactive cap 20 since the inactive cap 20 is kept from rotating relative to the valve body 10. When the inclined edge 31 of the active cap 30 moves along the inclined edge 21 of the inactive cap 20, the active cap 30 pushes the inactive cap 20 to slide inwardly or outwardly to the outlet 11 of the valve body 10.

When the inactive cap 20 slides inwardly to the outlet 11 of the valve body 10, the piston 12 is pushed by the inactive cap 20 to compress the elastic element 13 more. Based on Hooke's Law, the more the elastic element 13 is compressed, the force of the elastic element 13 is larger. Since the force of the elastic element 13 is larger, the outlet pressure has to be even larger to sufficiently offset the force of the elastic element 13. Therefore, the preset outlet pressure is increased to match the desired outlet pressure.

When the inactive cap 20 slides outwardly to the outlet 11 of the valve body 10, the piston 12 is pushed by the elastic element 13 and then the elastic element 13 is compressed less. Based on Hooke's Law, the less the elastic element 13 is compressed, the force of the elastic element 13 is smaller. Since the force of the elastic element 13 is smaller, the outlet pressure has to be even smaller to sufficiently offset the force of the elastic element 13. Therefore, the preset outlet pressure is decreased to match the desired outlet pressure.

In addition, the space between the notch 32 of the active cap 20 and the outer end of the inactive cap 20 is changed while the inactive cap 20 slides inwardly or outwardly to the outlet 11 of the valve body 10. Then which ever section 401, 402, 403 corresponds to the notch 32 and is revealed through the space is changed as well to indicate the pressure adjusting result.

The advantages of the adjustable pressure valve as described are recited as follows. With the inclined edge 21 of the inactive cap 20 abutting against the inclined edge 31 of the active cap 30, the inactive cap 20 is pushed to slide inwardly or outwardly to the valve body 10 while the active cap 30 is rotated. The slide of the inactive cap 20 causes the compression difference of the resilient element 13 to adjust the preset outlet pressure of the valve body 10. Thus, the preset outlet pressure of the adjustable pressure valve as described is adjustable without disassembling the adjustable pressure valve as described. Further, the adjusting result between the inactive cap 20 and the active cap 30 is easily identified by the marks on the sections 401, 402, 403 of the indicator 40.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the fullest extent indicated by the broad general meaning of the terms in which the appended claims are expressed.

What is claimed is:

1. An adjustable pressure valve comprising:
   a valve body having
      a shell with an outlet;
      a piston mounted slidably in the shell near the outlet; and
      an elastic element mounted in the shell and pressed between the piston and inside wall of the shell;
   an inactive cap mounted slidably through the outlet of the valve body, abutting against the piston, kept from rotating relative to the valve body, and having
      an outer end; and
      an inclined edge formed on the outer end of the inactive cap; and
   an active cap mounted rotatably against the inactive cap, and having
      a sidewall;
      an inner end facing the outer end of the inactive cap; and
      an inclined edge formed on the inner end of the active cap and abutting against the inclined edge of the inactive cap.

2. The adjustable pressure valve as claimed in claim 1, wherein
   multiple teeth are formed on the inclined edge of the inactive cap; and
   multiple teeth are formed on the inclined edge of the active cap and engaging the teeth of the inactive cap.

3. The adjustable pressure valve as claimed in claim 2 further comprising an indicator, wherein
   the active cap has a notch formed through the sidewall and formed in the inner end of the active cap; and
   the indicator is mounted slidably in the active cap, is kept from detaching from the active cap, and has a sidewall divided into different sections, wherein the sections of the sidewall of the indicator selectively correspond to the notch and respectively have different marks.

4. The adjustable pressure valve as claimed in claim 3, wherein the different marks are different colors.

5. The adjustable pressure valve as claimed in claim 3, wherein the different marks have different letters or symbols.

6. The adjustable pressure valve as claimed in claim 1, wherein
   multiple steps are formed on the inclined edge of the inactive cap; and
   multiple steps are formed on the inclined edge of the active cap and engaging the steps of the inactive cap.

7. The adjustable pressure valve as claimed in claim 6 further comprising an indicator, wherein
   the active cap has a notch formed through the sidewall and formed in the inner end of the active cap; and
   the indicator is mounted slidably in the active cap, is kept from detaching from the active cap, and has a sidewall which is divided into different sections, wherein the sections of the sidewall of the indicator selectively correspond to the notch and respectively have different marks.

8. The adjustable pressure valve as claimed in claim 7, wherein the different marks are different colors.

9. The adjustable pressure valve as claimed in claim 7, wherein the different marks have different letters or symbols.

10. The adjustable pressure valve as claimed in claim 1, wherein
the inclined edge of the inactive cap is flat; and
the inclined edge of the active cap is flat.

11. The adjustable pressure valve as claimed in claim 10 further comprising an indicator, wherein
the active cap has a notch formed through the sidewall and formed in the inner end of the active cap; and
the indicator is mounted slidably in the active cap, is kept from detaching from the active cap, and has a sidewall which is divided into different sections, wherein the sections of the sidewall of the indicator selectively correspond to the notch and respectively have different marks.

12. The adjustable pressure valve as claimed in claim 11, wherein the different marks are different colors.

13. The adjustable pressure valve as claimed in claim 11, wherein the different marks have different letters or symbols.

14. The adjustable pressure valve as claimed in claim 1 further comprising an indicator, wherein
the active cap has a notch formed through the sidewall and formed in the inner end of the active cap; and
the indicator is mounted slidably in the active cap, is kept from detaching from the active cap, and has a sidewall divided into different sections, wherein the sections of the sidewall of the indicator selectively correspond to the notch and respectively have different marks.

15. The adjustable pressure valve as claimed in claim 14, wherein the different marks are different colors.

16. The adjustable pressure valve as claimed in claim 14, wherein the different marks have different letters or symbols.

* * * * *